United States Patent [19]
Cattell et al.

[11] Patent Number: 5,535,325
[45] Date of Patent: Jul. 9, 1996

[54] METHOD AND APPARATUS FOR AUTOMATICALLY GENERATING DATABASE DEFINITIONS OF INDIRECT FACTS FROM ENTITY-RELATIONSHIP DIAGRAMS

[75] Inventors: Kevin T. Cattell, Garner; William R. Cromer, Raleigh, both of N.C.; Shihta Lin, San Jose, Calif.; Bruce E. Neuchterlein, Cary; Thomas E. Potok, Apex, both of N.C.

[73] Assignee: International Business Machines Corporation, Armonk, N.Y.

[21] Appl. No.: 358,273

[22] Filed: Dec. 19, 1994

[51] Int. Cl.⁶ ............ G06F 15/00; G06F 7/00; G06F 15/40
[52] U.S. Cl. .............. 395/161; 395/155; 395/600
[58] Field of Search .................. 395/161, 155, 395/600

[56] References Cited

U.S. PATENT DOCUMENTS

| | | | |
|---|---|---|---|
| 5,179,698 | 1/1993 | Bachman et al. | 395/600 |
| 5,193,182 | 3/1993 | Bachman et al. | 395/600 |
| 5,193,183 | 3/1993 | Bachman et al. | 395/600 |
| 5,195,178 | 3/1993 | Krieger et al. | 395/157 |
| 5,212,771 | 5/1993 | Gane et al. | 395/160 |
| 5,241,645 | 8/1993 | Cimral et al. | 395/500 |
| 5,249,300 | 9/1993 | Bachman et al. | 395/800 |
| 5,297,249 | 3/1994 | Bernstein et al. | 395/156 |
| 5,315,709 | 5/1994 | Alston, Jr. et al. | 395/600 |
| 5,388,196 | 2/1995 | Pajak et al. | 395/153 |
| 5,428,776 | 6/1995 | Rothfield | 395/155 X |

Primary Examiner—Raymond J. Bayerl
Assistant Examiner—A. Katbab
Attorney, Agent, or Firm—Edward H. Duffield

[57] ABSTRACT

A computer-implemented process accepts information input from an existing ER model of data representing a given environment and, in response to the input, automatically creates a new database structural definition that represents indirect facts about a base entity that are indicated by the input.

10 Claims, 6 Drawing Sheets

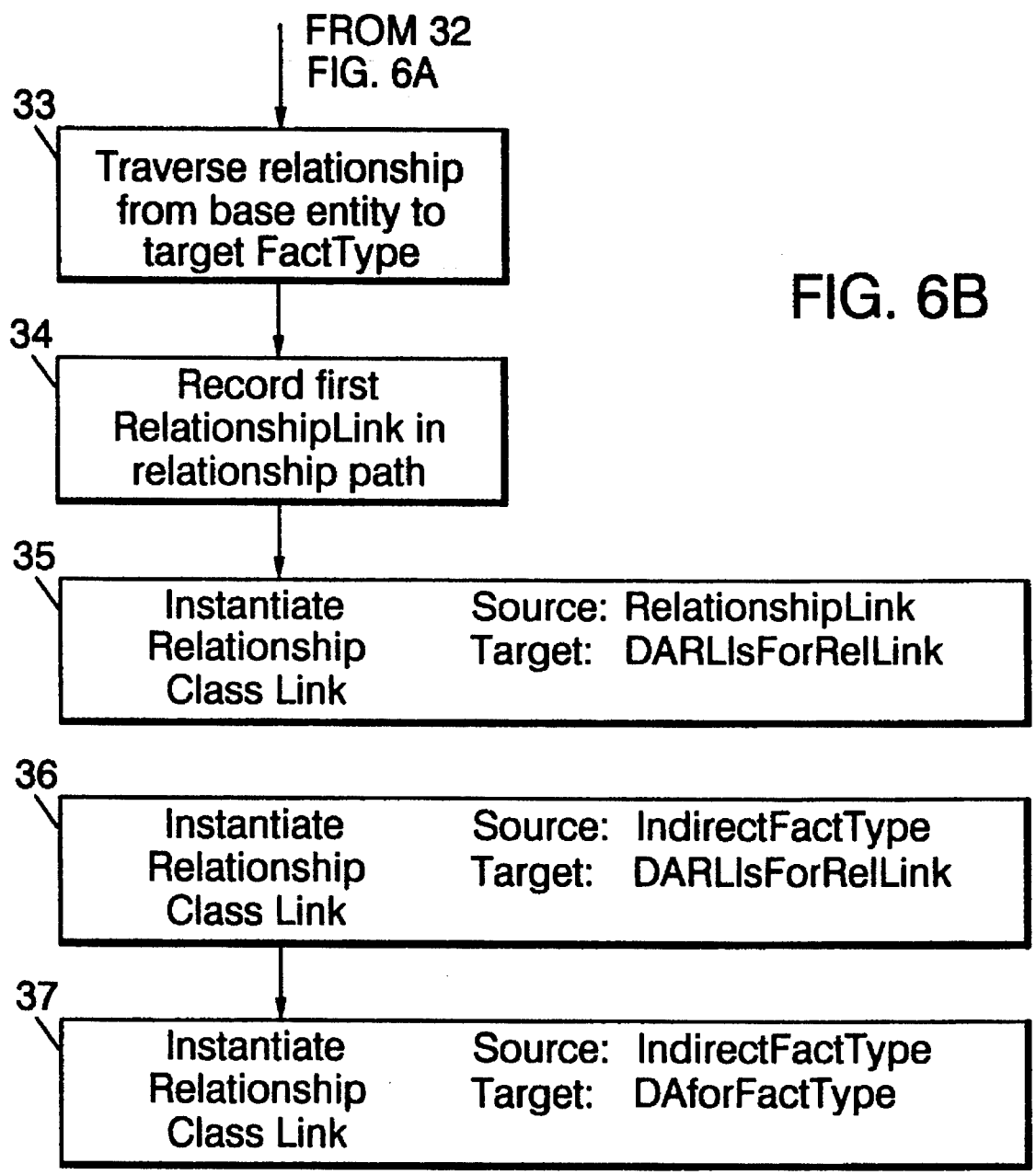

METHOD AND APPARATUS FOR AUTOMATICALLY GENERATING DATABASE DEFINITIONS OF INDIRECT FACTS FROM ENTITY-RELATIONSHIP DIAGRAMS

FIELD OF THE INVENTION

This invention relates to information modelling and database organizational structure definitions in general, and more specifically, it relates to method for transforming entity relationship representations of data models for a business environment into database structural definitions that allow storage and easy location of information related to any specific entity in the basic ER model.

BACKGROUND

Information models and information modelling element definitions and theories abound. A commonly appearing modelling technique for business information capture and retrieval is the so-called Entity-Relationship (ER) data model. Several designs of ER data models exist and are commonly employed. A typical one is the IBM AD/Cycle Information Model as shown in IBM publication SN68-1242-00 dated May 1992, which presents, in two volumes, a typical entity and relationship definition model for making ER diagrams to represent business information in given contexts and settings of interest to the information model designers.

Information models based on ER diagrams must be converted into database definitional structures generated into columns and keys to enable storage and retrieval of data from the informational model to be carried out smoothly in a computer system. A number of automated tools exist to assist a human information model designer to generate ER diagrams representing entities, their interrelationships and their individual attributes in an ER data model diagram. In addition, a number of automated program tools exist for automatically converting or generating a database structural definition or design from an ER model represented by a designer using a computer system. Tools such as the IBM Repository Manager or the Bachman/DBA may be used to automatically generate database definitions for structuring a database with the data from an ER model diagram, once such a diagram has been constructed by the human designer with or without the aid of a design tool.

The information model developed by a designer can be used with computer aided software engineering tools of the sort described to represent ER design information. ER models are made up of entities, relationships and attributes. Entities represent real persons, places or things, while relationships represent associations between two or more entities, and attributes represent characteristics relating to a given entity or relationship. Relationships and attributes are considered to be "facts" about an entity or relationship. Facts can in turn be made up of a combination of relationships and attributes or can be derived from existing relationships and attributes for given entities. Derived facts are those which are sometimes referred to as "indirect facts", and are based not on the specific entities on which the data model is based but, instead, are based on related or associated entities to the base entity and/or to relationships among entities.

Once an ER data model has been created by a designer, either acting alone or with the use of a CASE tool, other CASE tools can be used to automatically generate a database structural definition that corresponds to the items in the ER model with the aforementioned Bachman/DBA or IBM Repository Manager being but two examples.

In conventional ER data modelling techniques, an entity can be described by a relationship fact or an attribute fact and, in more advanced modelling techniques, the facts themselves can be described by a combination of relationship facts and attributive facts. However, there exists today no way for automatically generating a database definitional structure from an ER model in order to represent indirect facts. This limitation prevents many real-world situations from being adequately modelled automatically in a database definition generated from an existing ER model.

OBJECT OF THE INVENTION

In light of the foregoing known deficiencies in the prior art, it is an object of this invention to provide an improved automatic database definition generation tool which can automatically represent indirect facts about an existing ER model and generate, automatically, a corresponding database definition that will provide easy access in a database to indirect facts about a given base entity or relationship.

BRIEF SUMMARY OF THE INVENTION

The invention is implemented in a computer program having means for accepting informational input from an existing ER model of data representing a given environment. And, in response to operator inputs defining (1) the base entity or relationship for which an indirect fact type database definitional entry is to be generated, (2) input representing the target fact type attribute or relationship, which is the indirect fact, and (3) information relative to the first relationship link found linking the base entity to the identified indirect fact, means for automatically creating a new database definition directly in a structural definition for the database to store and retrieve the identified indirect facts in relation to the identified base entity.

BRIEF DESCRIPTION OF THE DRAWINGS

The invention will be illustrated in greater detail with respect to a preferred embodiment thereof which is illustrated in the accompanying drawings in which FIG. 1 schematically illustrates a simple ER diagram modelling a hypothetical set of three entities and relationships among them.

DETAILED DESCRIPTION OF THE PREFERRED EMBODIMENT

Having discussed the general background in which the present invention finds its utility, a preferred embodiment of the invention will now be described in detail in a typical example or setting of an information modelling problem and environment that may be commonly encountered.

Figure 1:
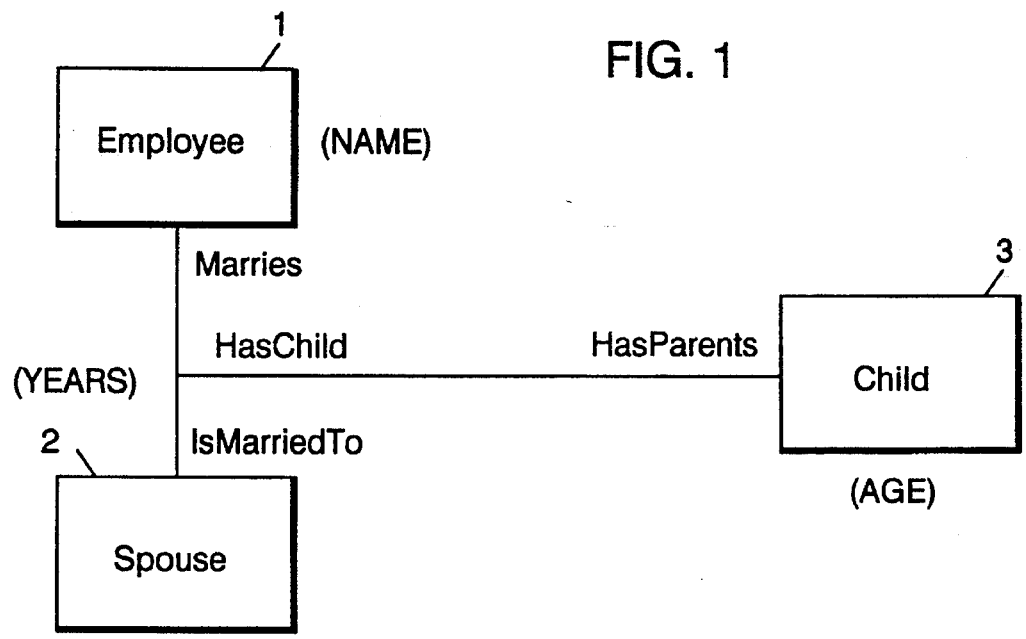

In this regard, FIG. 1 schematically illustrates a simple ER model of data that may be gathered in a database in a data model used by, for example, an insurance company to validate insurance claims regarding a known or named employee, the employee's spouse and child who may be covered under the employee's policy with the insurance company. The entities in the ER diagram are therefore the base entity employee and the related entities of spouse and child. Relationships between the employee and spouse are also represented in the diagram of FIG. 1 by the interconnecting lines of the ER diagram for the Marries-IsMarriedTo relationship and for the HasChild-HasParents relationship. Direct attributes of the employee, such as name, or of the associated child entity, such as age, or of the marriage relationship, such as the number of years it has been in existence, are indicated in the diagram of FIG. 1. The chief facts describing the several entities are therefore the name for the employee, the years in existence of the marriage relationship, and the age for child, while the important relationships illustrated are the marriage relationship and the child-parent relationship.

From the model, an insurance company might wish to generate a database definition that could be used in structuring a database to contain the data and allow easy retrieval of data to answer specific questions such as, when a claim is presented, who the eligible employee might be, and whether the person on the claim is covered. Using currently available CASE tools such as those noted above, a database definition could easily be automatically generated from the simple ER diagram in FIG. 1, and the result of such an operation using one of these known tools is shown schematically in FIG. 2.

Figure 2:
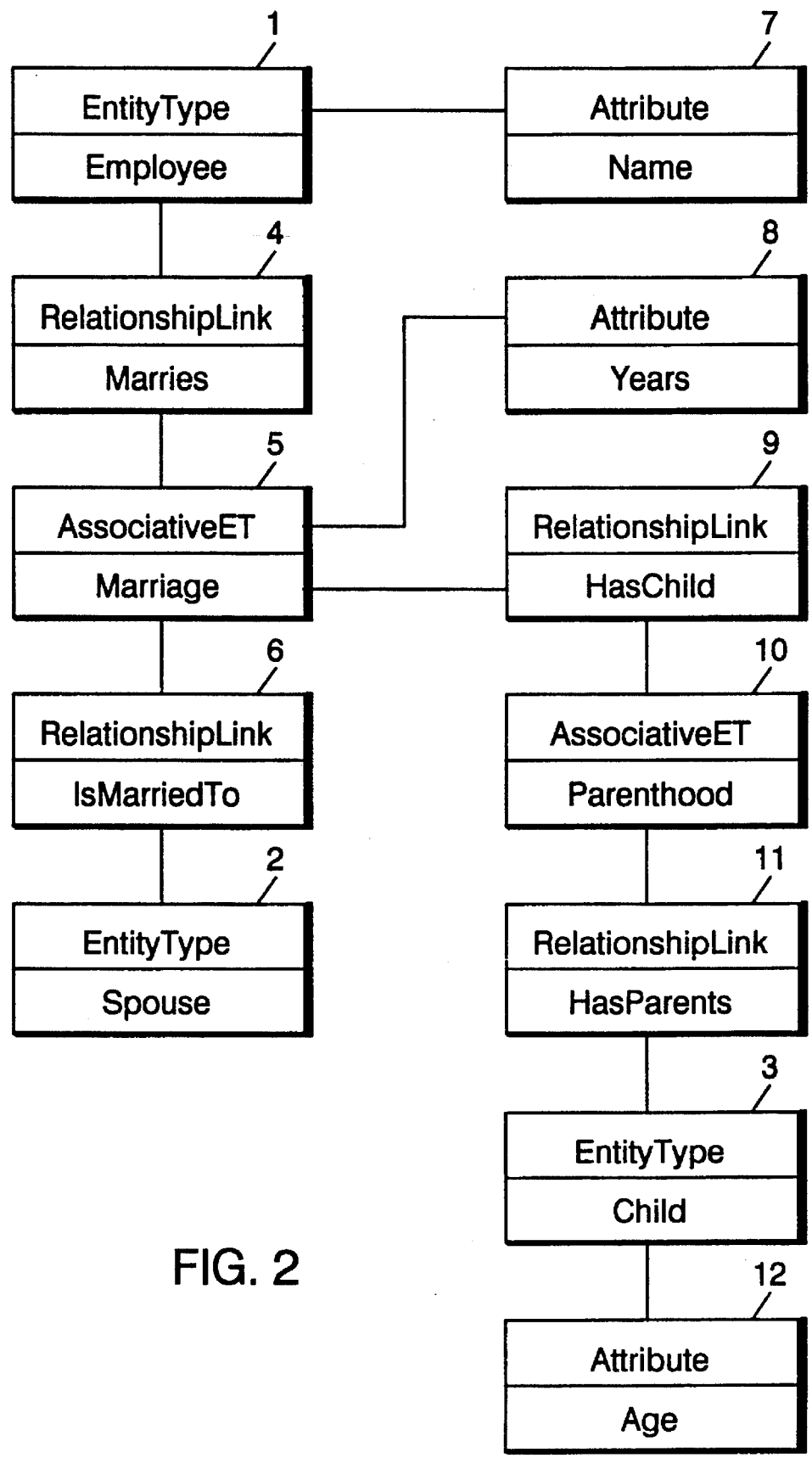
FIG. 2 schematically illustrates a database structural definition based upon the ER diagram of FIG. 1.

In FIG. 2, the information from the ER diagram in FIG. 1 has been translated into a database structural definition of a base entity representing the employee and his direct attribute name as shown.

In FIG. 2, the employee is shown by box 1, as was used in FIG. 1 for the employee, the employee's spouse is shown by box 2, as was done in FIG. 1, and the child is illustrated by box 3. However, it will be noted that a number of other boxes and definitions have been generated by the CASE tool. These include a representation of a relationship link box for the Marries portion of the marriage relationship, shown in box 4, an associative entity for the marriage itself, shown in box 5, a relationship link for the IsMarriedTo portion of the relationship, shown in box 6, and with interconnecting lines to join the relationship links to the associative entity for marriage and to the base employee entity and the spouse entity. Direct facts regarding the base entity in box 1 are the relationship link for the marriage, box 4, and the name attribute, box 7.

Now, for example, if an indirect fact regarding the base employee entity in box 1 in FIG. 2 were desired from the database, such as the number of years the employee has been married or the age of the employee's child, these indirect facts cannot be easily obtained from a structured database because the database will be structured in accordance with FIG. 2 and will contain tables representing the employee with columns representing direct facts about the employee or relationships between the employee and other entities. For example, using the aforementioned Bachman/DBA, an ER data model containing an entity and attributes for the entity will be represented in a database organizational structure including a table for an entity, with columns in the table for the attributes associated with the entity. Indirect facts, which are associated not with the base entity itself but with facts or relationships about the base entity itself, cannot be easily extracted by an automatic system without guidance of a human operator or further analysis and restructuring of the database to associate the desired data, i.e. indirect facts, directly with the base entity. It is this capability to which the present invention is addressed, as this capability has been lacking in the aforementioned prior art.

Returning to the hypothetical example, the indirect attributes regarding the number of years the employee has been married or the age of the employee's child may be essential for the insurance company to determine if coverage under the employee's policy pertains. The data itself is present in the database structure as shown in FIG. 2, but cannot be easily accessed or discovered without a lengthy hit or miss traversal of the overall definition model by the computer. This type of search can be implemented and may yield quick results or very slow results depending upon the path taken and the search. Normally, a programmer is required to write new code, redesigning the database definitional structure to make the query more efficient. However, such redefinitions of the database involve time consuming human analysis, intervention, and recoding of the database structure to achieve this result. Using the automated process of the present invention, the desired restructuring of the database definition can be automatically created.

Figure 3:
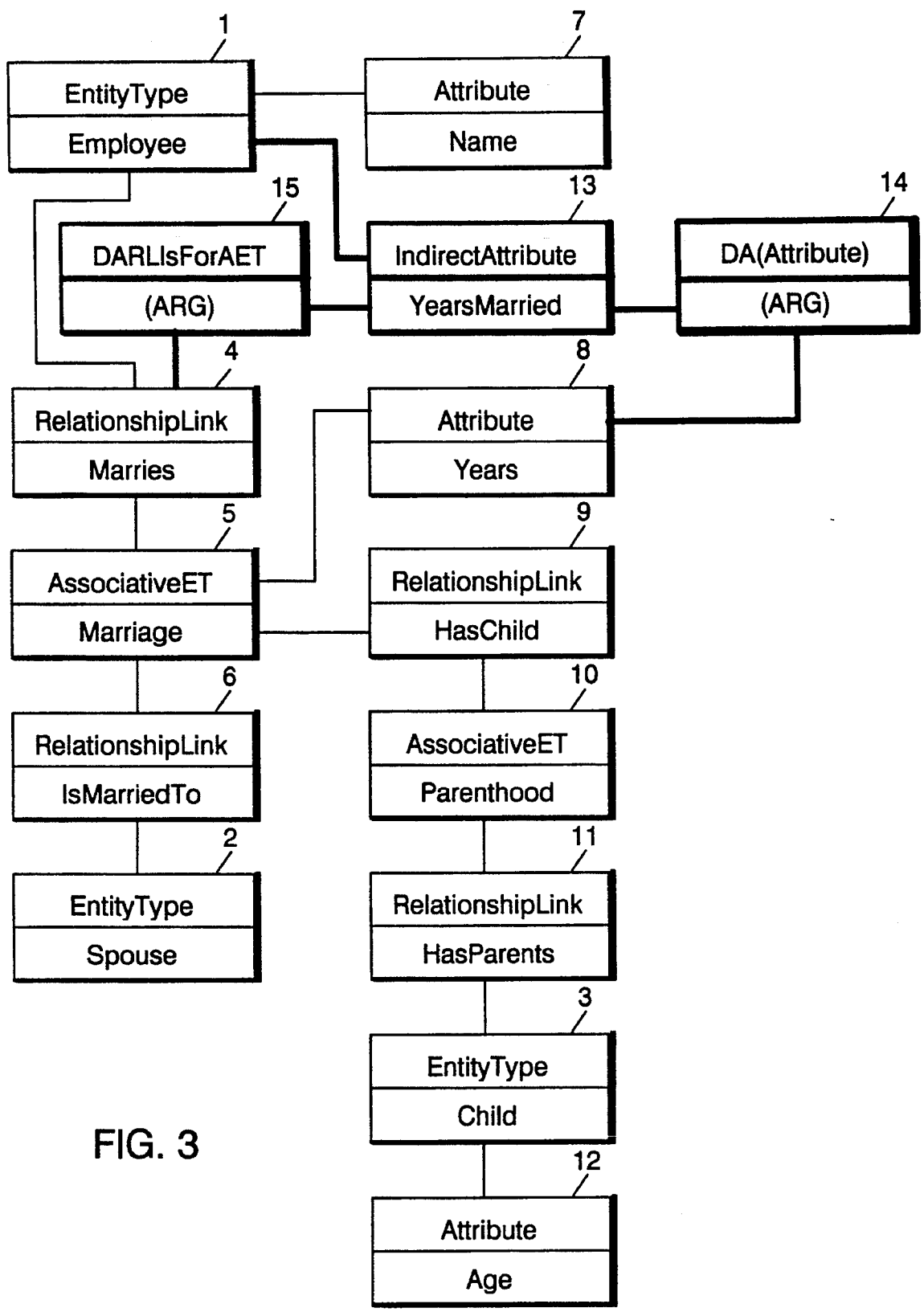
FIG. 3 schematically illustrates a database definitional structure similar to that shown in FIG. 2, but including improved representational definitions for a fact, which is not a direct fact, associated with the base entity in FIG. 1, which improved representation is generated as a result of the process in accordance with the preferred embodiment of the invention herein.

For example, in order to determine the number of years the base entity employee has been married, the database definitional model could be modified, as shown in FIG. 3, to include an indirect fact box 13 for the indirect attribute of years married that could be linked directly to the employee base entity 1. The indirect fact, which is the attribute IsMarried in block 13 of FIG. 3, can be linked through a derivation argument for such an indirect fact in block 14 to the target indirect fact in block 8, which is the years associated with the marriage entity in block 5. To complete the linkage between the indirect fact in block 13 regarding the number of years the base entity 1 has been married, the derivation argument in block 15 links block 13 to the relationship link in block 4 to indicate that block 8, linked to by block 14, must be the one belonging to associative entity (Block 5) that is linked to block 1 through 15.

It should be noted that such a hypothetical example would require the creation of new columns in the structure of an information model in the database definition to contain the new indirect fact of years married as shown in block 13, with the associated linkage boxes or placeholders 14 and 15 for the logical derivation arguments that link this indirect fact placeholder of block 13 to the actual target indirect fact in block 8. From this it may be quickly seen that some analysis on the part of a human programmer for creating a new column entry in the database definition and for the associated entries or columns for the linkage to the existing columns and entries in the database would be required. This is a somewhat laborious task, prone to error and inefficiency and quite beyond the capability of the existing prior art conversion tools.

The example shown in FIG. 3 is specifically for an indirect fact (of the attribute variety) associated with the base entity employee in box 1 via the marriage relationship associative entity in box 5. But this requires linkages not only directly to the indirect attribute placeholder in box 13, but to the relationship links in box 4 and the target indirect attribute of the employee in box 8, which is associated with his marriage in box 5. However, utilizing the preferred embodiment of the invention that will be described herein, and viewing a representation such as shown in FIG. 2, a human operator need only supply the information necessary to identify the base entity with which a query should start to find a desired indirect fact, whether that fact be an attribute fact or relationship fact, and to supply the desired target fact type, be it an attribute or relationship, while executing the process of the preferred embodiment that will be described later with reference to FIG. 6.

Figure 4:
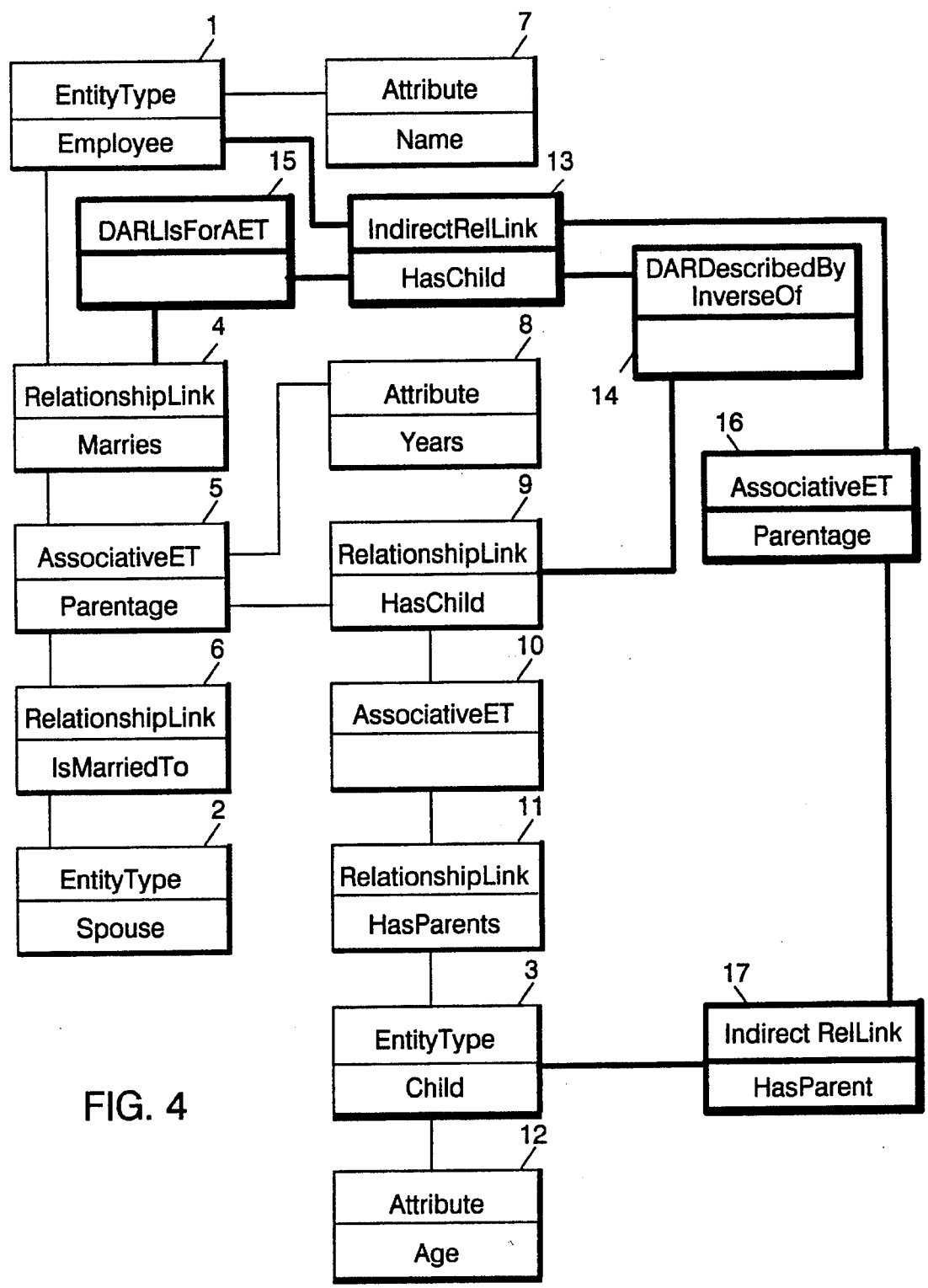
FIG. 4 illustrates another example of an enhanced database definition that may be automatically generated by the preferred embodiment of the invention herein.

Turning now to FIG. 4, a second example of an indirect fact type which represents a relationship linkage rather than an attribute of an entity is illustrated. Similar numbering to FIGS. 2 and 3 has been employed for the same entities and relationships and for the placeholder blocks to represent the indirect relationship fact for a query beginning with the employee as the source entity in relating to the child where the child is shown in block 3 and the employee in block 1. The facts of parentage and its linkage from the employee entity in box 1 to the child entity in box 3 could be found by trial and error to answer the question regarding the age of the employee's children, but a much more direct linkage is possible as shown by the added blocks 13, 14, 15, 16 and 17. This type of data definition for the database can also be automatically constructed by the invention will be described with regard to FIG. 6 utilizing the same process as for the result illustrated in FIG. 3.

Figure 5:
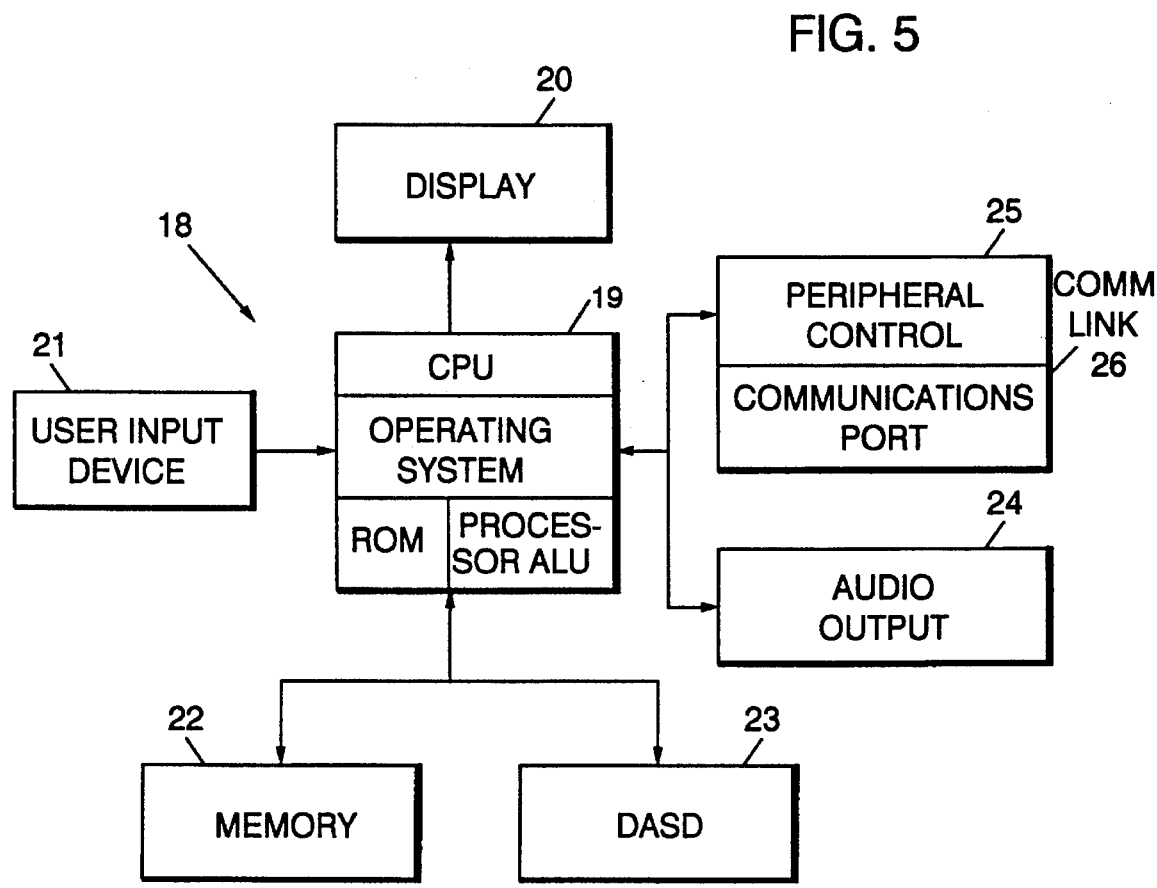
FIG. 5 schematically illustrates a computer system in which the present invention finds its utility and specifically includes representation for DASD and/or memory in which the database structural definition may be employed to organize the information about the entities and their attributes.

Turning briefly to FIG. 5, a typical computer system in which the present invention can be practiced and utilized is illustrated. In FIG. 5, the overall computer system is illustrated by numeral 18 and includes a Central Processor (CPU) 19 having a typical operating system, processor or arithmatic logic unit (ALU) and its own resident program memory as well as access to working memory such as Random Access Memory (RAM) 22 or a Direct Access Storage Device (DASD) such as a diskette, tape drive or the like illustrated as 23. A user input device, which could be a keyboard, mouse, microphone and voice recognition program or the like is illustrated by numeral 21 and peripheral device controls and the communications port with a communications link are illustrated by numerals 25 and 26 with possible audio output or input illustrated by box 24.

In the context of the present invention, the insurance company's database might be located in DASD 23 of FIG. 5 and loaded into working memory 22 for processing when information about the employee or a claim is desired.

Figure 6A:
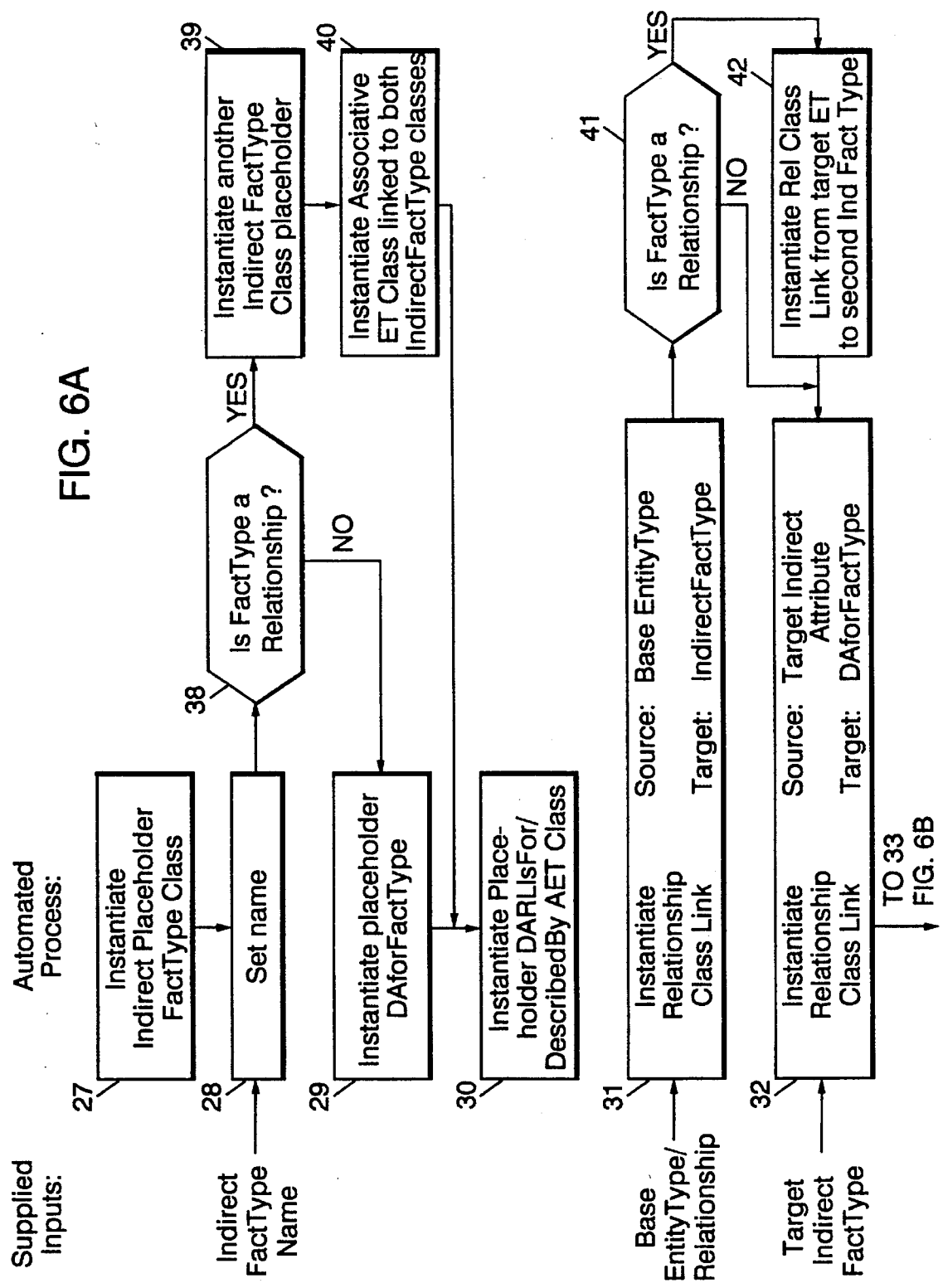
FIG. 6 schematically illustrates in process flow form, the steps in the automatic generation process of the preferred embodiment of the present invention.

Similarly, when utilizing the invention herein, a database definition designer using a CPU system, such as that illustrated by numeral 18 in FIG. 5, would load a diskette or tape into the DASD system 23 of FIG. 5 to begin execution of the process shown in FIG. 6, which is the preferred embodiment of the invention, and would then turn to actual data inquiries utilizing the same system in FIG. 5 to access the database with the insurance information in it.

The preferred embodiment of the invention is schematically illustrated in the process flow of FIG. 6 representing blocks in the computer process that would be part of a program tool, such as those referred to earlier in the prior art, for automatically creating a new database definition directly from entity relationship diagram.

Turning to FIG. 6, an automated process which responds to operator inputs and automatically creates the placeholder boxes 13 through 17, as illustrated in FIGS. 3 and 4, is described. From an existing ER model, such as that shown in FIG. 1, and following an automated process used by the CASE tools, such as those previously described, where the CASE tool includes the new automated process, as shown in FIG. 6, a new database structural definition can be automatically generated that will support queries directed to indirect facts such as attributes or relationships. The flow chart in FIG. 6 defines steps for a computer program to automatically generate the database definition model as shown in FIGS. 3 and 4, where an indirect fact, which may be either an attribute of an entity or a relationship, are the features that would be sought in a data query. As used in this flow diagram of FIG. 6, the word "instantiate" is a term used to describe the creation in computer memory of a record for a given data structure element in memory 22 of a computer system, such as shown in FIG. 5, for display as a box or block on a display such as 20 as shown in FIG. 5.

The process in FIG. 6 begins with block 27 and ends with block 37, and would be a portion of the program in a CASE tool for carrying out this part of an automatic conversion that is the subject of the present invention. In other words, given an existing prior art CASE tool that can generate from FIG. 1, a representation of a database definition as shown in FIG. 2, the improved process in FIG. 6 allows the creation of the additional blocks 13 through 17 as illustrated in FIGS. 3 and 4 in an automated fashion without requiring the designer's analysis or input to create the new database definitional structure.

The first step in the process of FIG. 6 is to instantiate an indirect fact type placeholder block 27. This would be illustrate in FIGS. 3 and 4 as block 13 being displayed on the display 20 of FIG. 5 in response to the CPU 19 running a CASE program loaded through DASD 23, for example, in FIG. 5, and containing the routine of FIG. 6. Operation continues to block 28 where the operator is prompted for entry of the indirect fact type name which, in the case of FIG. 3, would be the YearsMarried name entered in block 13 on the face of a display 20, such as shown in FIG. 5, and in the case of FIG. 4, could be the HasChild name entered in Block 3.

The next step is in block 29 of FIG. 6, where an instantiation for a derivation argument for the indirect fact type is undertaken (derivation argument is abbreviated DA in this figure). Next, in block 30, the program instantiates a placeholder for the derivation argument for the relationship link. This corresponds to block 15 in FIGS. 3 and 4, whereas the result of block 29 represents block 14 in those figures.

At this point, it may be seen that the process as carried out in FIG. 6 will have generated three rectangular boxes or placeholders numbers 13, 14 and 15, respectively, in FIGS. 3 and 4. However, the boxes are not interconnected or linked to one another or, indeed, to other attributes or relationships links. In order to accomplish appropriate linking, the process of FIG. 6 requires further information which includes the identification of the base entity, so that a link between the source base entity and the new desired indirect fact, which will be included in the placeholder block 13, can be drawn automatically on the face of the display 20 in FIG. 5. The result will be a link between block 1 and block 13 as shown in FIGS. 3 and 4.

The next piece of information required from the operator is identification of the target indirect fact type, which is the age attribute of marriage associate entity in block 8 of FIGS. 3, or the HasChild relationship link of the marriage associate entity in Block 9 of FIG. 4, so that a link between the derivation argument for the indirect fact type, as shown in block 14 in FIGS. 3, and the desired indirect target fact in block 8 in FIG. 3 or Block 9 in FIG. 4 can be drawn, as shown by the link in FIGS. 3 between blocks 14 and 8, and FIG. 4 between blocks 14 and 9. These steps are the result of the process in blocks 31 and 32 of FIG. 6.

Continuing to block 33 and 34 of FIG. 6, it is necessary for the process to obtain information, either from the human operator or from an automatic process of tracing using a CASE tool, to locate and record the first relationship link in the relationship path from the base entity to the desired target indirect fact. This may either be had by the operator identifying that the first relationship link is the Marries relationship link in box 4 of FIGS. 3 and 4, or utilizing an automated CASE tool, such as the aforementioned IBM or Bachman tools, to identify the base entity employee box 1 of FIGS. 3 and 4 and to allow the tool to trace the logical linkage pathway from the base entity in block 1 to the target attribute fact in block 8 or block 9, preserving a record of the first relationship link encountered in the path which, in this case, will be the relationship link Marries in block 4 of FIGS. 3 and 4. Thus, the process of FIG. 6 in blocks 33 and 34 may either be automatically carried out by the CASE tool as indicated by blocks 33 or 34, or may be supplied as an input by a human operator; but, the preferred embodiment is utilized in the automated CASE tool with the process steps as shown in 33 and 34 in FIG. 6.

With this information available, the process can execute the step in block 35 of linking from the relationship link to a target derivation argument for the relationship link, i.e., a link is formed between block 4 and block 15 as shown in FIGS. 3 and 4 as a result of execution of the step in block 35 of FIG. 6.

Continuing to block 36 of FIG. 6, a relationship link from the indirect fact type to the derivation argument relationship link is constructed so that a link between blocks 13 and 15 of FIGS. 3 and 4 is created. Continuing to block 37, a relationship link is created from the indirect fact type placeholder to the derivation argument for the actual indirect fact itself so that a link is created between block 13 and 14 in FIGS. 3 and 4.

As a result of executing the steps of the process shown in FIG. 6, blocks 13, 14 and 15 of FIG. 3 or FIG. 4 will have been constructed and displayed on the screen of display 20 in the computer system of FIG. 5 and the linkages between the blocks as shown in FIGS. 3 and 4 will have also been constructed, thereby providing a direct pathway linkage in the database definitional structure for a direct path from the employee entity, or block 1 to the indirect attribute of YearsMarried in block 8 by the linkage path through block 13 to block 14 to block 8 and placeholders or column entries in the database definitional tables which result from the use of such a CASE tool will have been generated so that inquiries of this specific type may be quickly answered by directing the database search engine from the base entity block 1 via the pathway quickly to block 8.

The diagram in FIG. 4 illustrated schematically the generation of a database definition model where the indirect facts may be relationship links. This representation is generated using the process of FIG. 6, which includes some additional steps for adding the extra placeholders for the associative ET block 16 in FIG. 4 and the additional placeholder for the indirect relationship link 17. The process as illustrated in FIG. 6 includes the additional boxes 38 through 42, which are invoked in response to the answer to the conditional question, "Is the indirect fact type a relationship?", and is self-explanatory from the diagram in FIG. 6. Because of the fact that relationship links are the indirect facts in this example, a new associative entity type 16 is required to link together the two halves of an indirect relationship link 13 and 17 that are required to model such a relationship—in this case, a relationship of parentage, including the reciprocal relations of parent who has child and child who has parent, as shown in block 13 and 17, respectively.

The diagram in FIG. 4 shows the construct for answering directly a query in the form of finding the age of the employee's child.

As may be seen from the foregoing, the processes illustrated in FIG. 6 is general and accounts for any type of indirect fact type, whether it be an indirect attribute of an entity or an indirect relationship between entities.

Applicability

The present invention finds ready applicability in the field of information modelling and, particularly, for automated conversion of representational entity relationship diagrams directly into database definitional models for constructing access paths and entries in a database to make the database responsive to inquiries directed to facts which are indirectly associated with the base entity which forms the base starting point for database construction.

Having thus described our invention with relationship to a preferred embodiment as detailed with examples of its implementation and function according to the best known mode, what is desired to be protected by letters patent and what is claimed is:

1. In a computer system comprising a computer processor, a database storage, a display and input means, a program memory and a program loaded therein wherein said loaded program automatically generates and displays on said display a database definitional plan for indirect facts associated with the database entity data, a computer process comprising steps performed in said computer of:

generating in said processor of said computer and displaying on said display means a first graphical placeholder block in a database definitional diagram for a user identified target indirect fact regarding a user identified target entity in an entity-relationship (ER) model of the user's business environment;

generating in said processor and displaying on said display means a second graphical placeholder block in a database definitional diagram for an indirect fact derivation argument;

generating in said processor and displaying on said display means a third graphical placeholder block in a database definitional diagram for an indirect fact derivation argument for an associative entity type relationship link;

generating in said processor and displaying on said display means a graphical path connecting said first graphical placeholder block to the said base entity of said database definitional diagram;

generating in said processor and displaying on said display means a graphical path connecting said second graphical placeholder block to said first graphical placeholder block;

generating in said processor and displaying on said display means a graphical path connecting said third graphical placeholder block to said first graphical placeholder block;

generating in said processor and displaying on said display means a graphical path connecting said third graphical placeholder block to the first relationship link representational block in said database definitional diagram encountered in a traverse of said diagram from said base entity of said diagram to said first graphical placeholder block; and generating in said CPU and displaying on said display means a graphical path connecting said second graphical placeholder block to said user identified target entity.

2. A process as described in claim 1, further comprising when said indirect fact type sought by said user is an indirect relationship of an entity, comprising further steps of:

generating in said processor and displaying on said display means a fourth graphical placeholder block in a database definitional diagram for an associative entity type;

generating in said processor and displaying on said display means a fifth graphical placeholder block for a relationship link; and generating in said processor and displaying on said display means a graphical connection from said first graphical placeholder block to said fourth placeholder block and from said fourth placeholder block to said fifth placeholder block, said connections being a part of said graphical path connecting said first placeholder block to said base entity of said database definitional diagram.

3. A process as described in claim 1, wherein:

said process further includes steps of receiving user inputs identifying a name for the user's requested indirect fact type, an identification of the base entity with which said indirect fact type is connected, and an identification of the target indirect fact type for which retrieval is sought.

4. A process is described in claim 2, wherein said process further includes steps of:

said process further includes steps of receiving user inputs identifying a name for the user's requested indirect fact type, an identification of the base entity with which said indirect fact type is connected, and an identification of the target indirect fact type for which retrieval is sought.

5. A CASE tool comprising instructions encoded on a computer-readable medium for automatically generating database definitional diagrams from ER diagrams on the display of a computer system, said tool comprising means for performing steps of:

generating in said computer and displaying on said display means a first graphical placeholder block in a database definitional diagram for a user requested indirect fact regarding a user identified target entity in an entity-relationship (ER) model of the user's business environment;

generating in said processor and displaying on said display means a second graphical placeholder block in a database definitional diagram for an indirect fact derivation argument;

generating in said processor and displaying on said display means a third graphical placeholder block in a database definitional diagram for an indirect fact derivation argument for an associative entity type relationship link;

generating in said processor and displaying on said display means a graphical path connecting said first graphical placeholder block to the said base entity of said database definitional diagram;

generating in said processor and displaying on said display means a graphical path connecting said second graphical placeholder block to said first graphical placeholder block;

generating in said processor and displaying on said display means a graphical path connecting said third graphical placeholder block to said first graphical placeholder block;

generating in said processor and displaying on said display means a graphical path connecting said third graphical placeholder block to the first relationship link representational block in said database definitional diagram encountered in a traversed of said diagram from said base entity of said diagram to said first graphical placeholder block; and generating in said processor and displaying on said display means a graphical path connecting said second graphical placeholder block to said user identified target entity.

6. A CASE tool as described in claim 5, and further comprising:

generating in said computer and displaying on said display means a fourth graphical placeholder block in a database definitional diagram for an associative entity type;

generating in said computer and displaying on said display means a fifth graphical placeholder block for a relationship link; and generating in said computer and displaying on said display means a graphical connection from said first graphical placeholder block to said fourth placeholder block and from said fourth placeholder block to said fifth placeholder block, said connections being a part of said graphical path connecting said first placeholder block to said base entity of said database definitional diagram.

7. A CASE tool as described in claim 5, wherein:

said process further includes steps of receiving user inputs identifying a name for the user's requested indirect fact type, an identification of the base entity or relationship with which said indirect fact type is connected, and an identification of the target indirect fact type for which retrieval is sought.

8. A CASE tool as described in claim 6, further including:

said process further includes steps of receiving user inputs identifying a name for the user's requested indirect fact type, an identification of the base entity or relationship with which said indirect fact type is connected, and an identification of the target indirect fact type for which retrieval is sought.

9. In a computer system comprising a computer processor, a database storage, a display and input means, a program memory and a program loaded therein wherein said loaded program automatically generates a database definitional plan for indirect facts associated with the database entity data, a computer process comprising steps performed in said computer of:

generating in said processor of said computer a first graphical placeholder in a database definitional diagram for a user requested indirect fact regarding a user identified target entity in an entity-relationship (ER) model of the user's business environment;

generating in said processor a second graphical placeholder in a database definitional diagram for an indirect fact derivation argument;

generating in said processor a third graphical placeholder in a database definitional diagram for an indirect fact derivation argument for an associative entity type relationship link;

generating in said processor a graphical path connecting said first graphical placeholder to the said base entity of said database definitional diagram;

generating in said processor a graphical path connecting said second graphical placeholder to said first graphical placeholder;

generating in said processor a graphical path connecting said third graphical placeholder to said first graphical placeholder;

generating in said processor a graphical path connecting said third graphical placeholder to the first associative entity type representational block in said database definitional diagram encountered in a traversed of said diagram from said base entity of said diagram to said first graphical placeholder; and generating in said processor a graphical path connecting said second graphical placeholder to said user identified target entity.

10. A CASE tool comprising instructions encoded on a computer-readable medium for automatically generating database definitional diagrams from ER diagrams on the display of a computer system, said tool comprising means for performing steps of:

generating in said computer a first graphical placeholder in a database definitional diagram for a user requested indirect fact regarding a user identified target entity in an entity-relationship (ER) model of the user's business environment;

generating in said computer a second graphical placeholder in a database definitional diagram for an indirect fact derivation argument;

generating in said computer a third graphical placeholder in a database definitional diagram for an indirect fact derivation argument for an associative entity type relationship link;

generating in said computer a graphical path connecting said first graphical placeholder to the said base entity of said database definitional diagram;

generating in said computer a graphical path connecting said second graphical placeholder to said first graphical placeholder;

generating in said computer a graphical path connecting said third graphical placeholder to said first graphical placeholder;

generating in said computer a graphical path connecting said third graphical placeholder to the first associative entity type representational block in said database definitional diagram encountered in a traversed of said diagram from said base entity of said diagram to said first graphical placeholder; and generating in said computer a graphical path connecting said second graphical placeholder to said user identified target entity.

* * * * *